Figure 4:
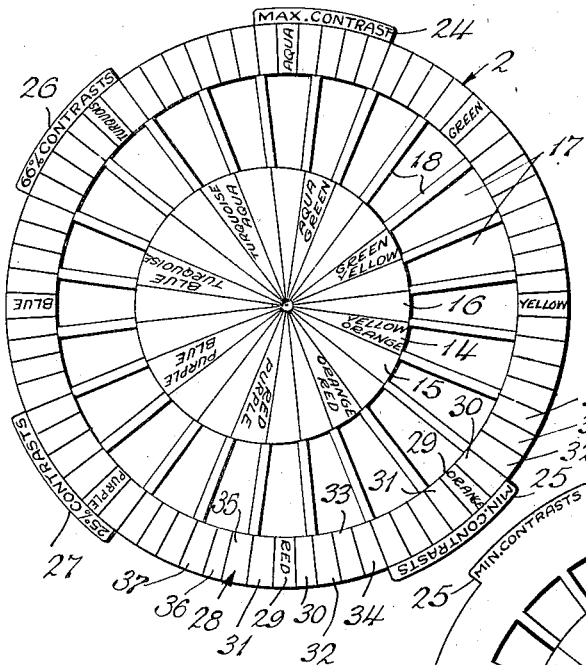

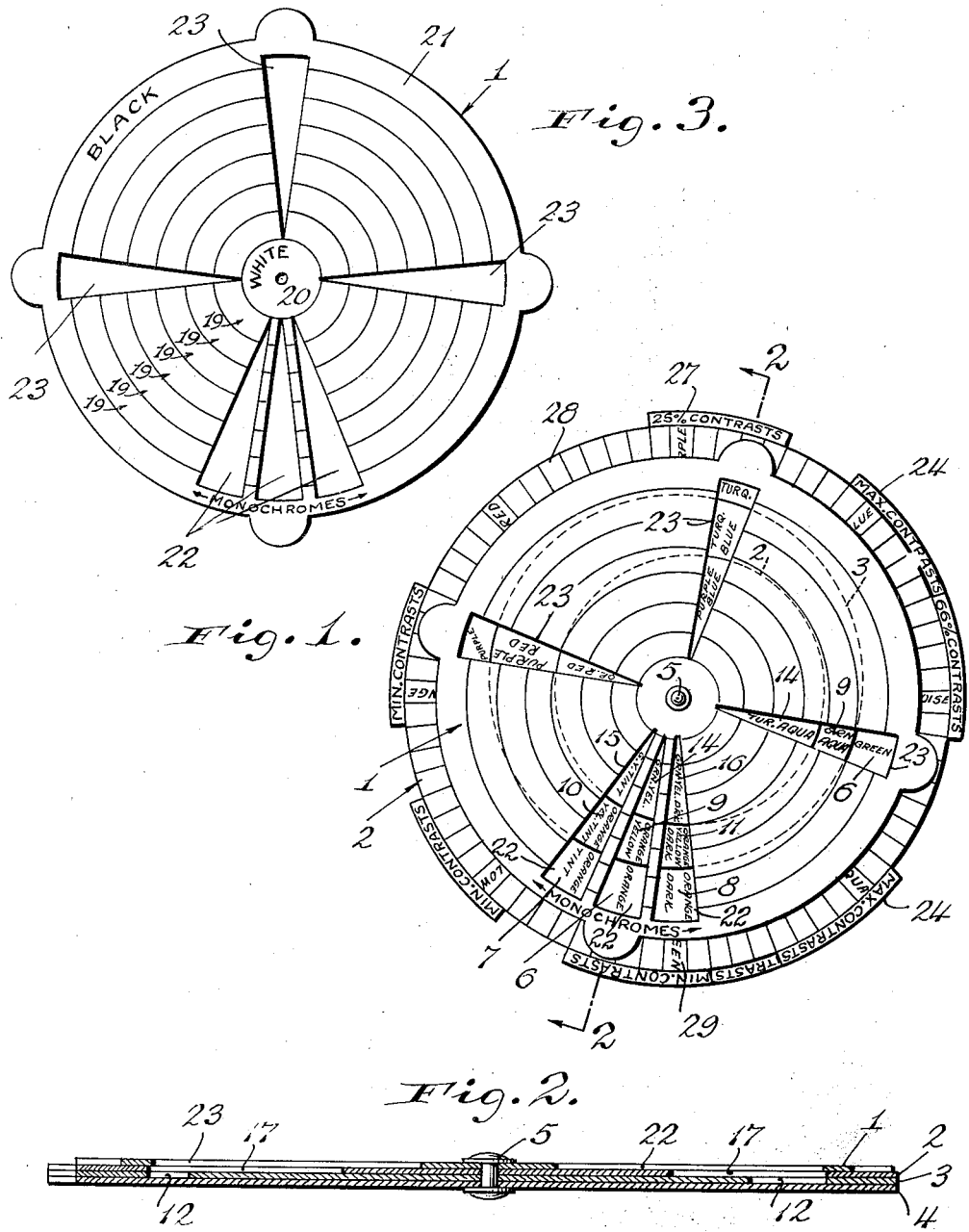

April 15, 1941.   J. P. GAUGLER   2,238,316
DEVICE FOR CONTRASTING CHROMATIC COLORS
Filed Sept. 15, 1939   2 Sheets-Sheet 2

INVENTOR
JOSEPH P. GAUGLER
BY
ATTORNEYS

Patented Apr. 15, 1941

2,238,316

UNITED STATES PATENT OFFICE 2,238,316

DEVICE FOR CONTRASTING CHROMATIC COLORS

Joseph P. Gaugler, Ridgewood, N. J.

Application September 15, 1939, Serial No. 295,102

7 Claims. (Cl. 88—14)

This invention relates to a device for selecting and automatically arranging color combinations on the basis of predetermined relative color values.

The public, and many persons engaged regularly in arranging color combinations, have great difficulty in evaluating or understanding the proper relative value of colors, particularly the harmony or lack of harmony of several colors. In consequence, in connection with the selection of colors for furnishings and household articles and many other purposes, although effort is made by the seller and purchaser of such articles to properly harmonize color combinations, experience has shown that great difficulty is experienced in this connection, primarily by reason of a lack of understanding or training with respect to the relative values of different colors or combinations.

This invention provides a device whereby the relative value of a tremendously large number of different colors can be ascertained. In fact, with the particular arrangement shown in the drawings, for the purpose of illustrating the invention, more than 13,000 combinations of color contrasts are possible.

One object of the invention is to provide a scientific color guide that may be used (even by individuals having no previous experience) to give an artistic contrast of several colors.

Other objects of the invention are: to provide a color guide that measures color contrast on a percentage basis; to provide a color guide indicating the proportion of the warm color to be used with the cool color; to provide a color guide in which the achromatic scale portion (see Fig. 3) is independently operable with respect to the chromatic scale portion of the guide; to provide a color guide in which the various suitable color contrast combinations are automatically brought into alignment merely by setting the color guide at the desired degree of color contrast.

Figure 5:
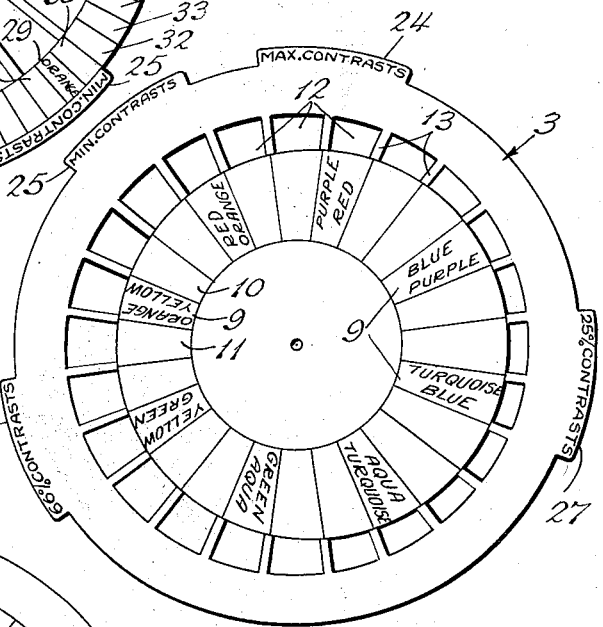

The accompanying drawings are presented to illustrate the preferred variation of the color guide. Fig. 1 shows a plan view of the assembled color guide; Fig. 2 a vertical cross-sectional view of the assembled color guide; Fig. 3 a plan view of the portion of the color guide consisting of the top or cover disc carrying the achromatic scale; Fig. 4 a plan view of the portion of the color guide consisting of the topmost chromatic disc; Fig. 5 a plan view of the portion of the color guide consisting of the intermediate chromatic disc; and Fig. 6 a plan view of the portion of the color guide consisting of the lowermost chromatic disc.

The invention is illustrated in connection with the use of four color cards or discs 1, 2, 3 and 4, which are suitably perforated and centrally secured together by a metal member 5 upon which the discs may freely rotate. The cover disc 1 is of slightly smaller diameter than the remaining three discs 2, 3 and 4 and each disc is provided with a series of tabs for manipulating and arranging the discs automatically in predetermined order.

The lowermost disc 4 is divided into a series of segments, twenty-four in number, equally spaced throughout the circle, each segment bearing a certain color. In the particular form of the invention shown in the drawings, the lowermost disc 4 is provided with a pure color representation or reproduction in every third segment 6; consequently there are between two pure colors 6, two additional segments. Upon each segment immediately bordering each pure color 6, there is applied a derivative or shade of the particular color 6. In each instance, the particular derivation of the pure color 6 is a lighter color or tint thereof applied in the segment 7, and a dark shade of each particular color applied in the segment 8. The tint 7 is obtained by adding to the pure color 6, in each instance, the same amount of white, and the dark shade 8 is obtained by adding the same amount of black. To illustrate, in connection with the pure color "Orange" shown on Figs. 1 and 6, the segment 6 marked "Orange" bears the pure color orange; the segment 7 a tint thereof containing an added amount of white, and the segment 8 a dark shade thereof containing an added amount of black. The same amount of white and black is added to each of the other seven colors shown on the disc 4, to obtain their respective tints and dark shades and these colors applied to the corresponding segments 7—8. The lowermost disc, therefore, has applied thereto a multiplicity of pure colors, including the pure colors of the spectrum, and each pure color 6 has applied, immediately bordering it, a tint and a dark shade of itself.

The disc 3, which is intermediate of the discs 2 and 4, is divided into a multiplicity of segments, twenty-four in number, as illustrated in Fig. 5, each third segment 9 of the entire circle having applied thereto a color which is a mixture of two adjoining colors on the disc 4. Such color mixtures 9 on the disc 3 are arranged in the same sequence as the pure colors on the lowermost disc 4. Thus, for instance, the "Orange-Yellow" segment of disc 3 represents a mixture of the two adjoining (in counterclockwise direction) pure colors "Orange" and "Yellow" of disc 4, in which the orange predominates. The succeeding colors 9 on disc 3 are likewise mixtures of two adjoining pure colors 6—6, in which the first color, in a counterclockwise direction, predominates. Each of the mixtures 9 of pure colors, on disc 3, is provided in the two border segments with a tint at one side and a dark shade at the other side. Thus, the "Orange-Yellow" segment 9 would be provided in segment 10 (clockwise) with a light tint and in segment 11 with a dark shade of the orange-yellow mixture. The tint for segment 10 is obtained by adding a definite amount of white to the orange-yellow mixture and the dark shade is obtained by adding a definite amount of black to the orange-yellow mixture. This same percentage of white and black is added to each of the other mixtures 9 represented on the card or disc 3, to produce the tint and dark shade of each mixture 9 and applied to the corresponding border segments 10—11. That portion of the disc 3 which has the colors applied thereto, has an eccentric contour, whereby the amount of colored area for some colors is less than others. It will be observed that by reason of the eccentric contour of the disc 3, the amount of yellow-green color is substantially less than turquoise-blue and the colors intermediate of the two show a gradually increasing amount of color area for each particular color over yellow-green.

The disc 3 is provided with a series of cut-outs or windows 12, which are framed by the strips 13, which windows, when the discs 3 and 4 are assembled, overlie the path of the colors on the disc 4.

The disc 2 is built up, in so far as its color segments are concerned, on the same basis as disc 3, excepting that the color dominating in the mixture 9 of disc 3 is subdued in disc 2. Thus, for instance, whereas the "Orange-Yellow" segment 9 in disc 3 shows a predominance of orange over yellow, the corresponding segment 14 in disc 2 shows a predominance of yellow over orange. The same rule holds true with respect to each other color combination on disc 2, the dominating color being the first color mentioned in each segment 14 in disc 2. Again in disc 2 each mixture is bordered by a tint 15 and a dark shade 16 of the particular mixture. Thus, for instance, the yellow-orange mixture 14 is bordered in the segment 15 by a tint of yellow-orange, obtained by adding to the yellow-orange mixture a definite amount of white, and on its opposite side 16 by a dark shade of the yellow-orange mixture, obtained by adding to the yellow-orange mixture a definite amount of black. Each of the other mixtures is treated in the same manner, by adding the same amount of white and black to obtain the corresponding border shades 15—16.

That portion of the disc 2 which has the colors applied thereto, also has an eccentric contour, whereby the amount of colored area for some colors is less than others. It will be observed that by reason of the eccentric contour of the disc 2, the amount of green-yellow color is substantially less than blue-turquoise and the colors intermediate of the two show a gradually increasing amount of color area for each particular color over green-yellow. The disc 2 is provided with a series of cut-outs or windows 17, which are framed by the strips 18, which windows, when the discs are assembled, overlie the paths of the colors upon the discs 3 and 4.

The cover disc 1 is provided with circular bands 19 of achromatic colors, beginning with the circular white center 20 and gradually increasing toward the black in an outward direction to the extreme band 21, providing a white center 20, with graduated shades of gray, and a black outer border 21. The disc 1 is provided with three windows 22, which have a sufficient area to overlie and expose to view three adjoining color segments on each of the discs 2, 3 and 4, as illustrated in Fig. 2. The cover disc 1 is also provided with three additional windows 23 for the purpose of exposing three spaced color segments on each of the discs 2, 3 and 4.

It will therefore be observed that the cover disc 1 carries a series of achromatic colors and the under discs 2, 3 and 4 each carry a series of chromatic colors.

The three discs 2, 3 and 4 are each provided at their peripheries with a multiplicity of tabs identifying various degrees of color contrast, whereby, when the tabs representing each percentage of color contrast are superposed, a predetermined relation of color values will be obtained by the alignment of color segments upon each of the three discs 2, 3 and 4, which are observable, in their order, through the windows 22 in the cover discs 1.

The invention, for the purpose of illustration, is shown in connection with three discs 2, 3 and 4, organized to illustrate minimum contrasts or little color contrast (isovalents), maximum contrasts (complementaries or 100%), and two intermediate contrasts, 66% contrast (triads) and 25% contrast (octads). Each of the discs 2, 3 and 4 is provided with equivalent tabs, each marked with the percentage of contrast. Thus discs 2, 3 and 4 each has a maximum contrast tab 24, a minimum contrast tab 25, a 66% contrast tab 26, and a 25% contrast tab 27.

When the isovalent or minimum contrast tabs 25 are superposed, then each pure color shown on disc 4 is contrasted with a mixture, on disc 3, of the pure color on disc 4 which is being examined and next pure color represented in a clockwise direction on disc 4 (in which the said next pure color dominates) and further contrasted with a mixture on disc 2 of the same two colors represented on disc 3 but in which mixture the pure color being examined dominates. Thus, for instance, if the pure color "Red" on disc 4 is being contrasted, such contrast will be with "Purple-Red" on disc 3 and the "Red-Purple" on disc 2. At the same time the border colors are observable through the two side windows of windows 22.

When the complementary, 100% or maximum contrast tabs 24 are superposed, then each pure color shown on disc 4 is contrasted with a mixture, on disc 3, of two different pure colors other than the particular pure color on disc 4 being examined, together with a mixture on disc 2 of another pure color and the particular pure color on disc 4 which is being examined. Thus, to illustrate, if the color on disc 4 which is being examined, through the center window of the windows 22, is the pure color "Orange," the mixture on disc 3 will be "Aqua-Turquoise" and the mixture on disc 2 will be "Orange-Red."

The border colors of each of the colors seen through the center windows 22 will also be contrasted with the corresponding border colors on each of the discs.

When the triads or 66% contrast tabs are superposed, then each pure color shown on disc 4 is contrasted with a color representing the dark shade of a mixture of two colors on disc 3 and the light shade of a mixture of two colors on disc 3. Thus, for instance, the pure color "Red" on disc 4 will be contrasted with the dark shade of "Yellow-Green" on disc 3 and the tint of "Turquoise-Aqua" on disc 2.

When the octads or 25% contrast tabs 27 are superposed, then each pure color shown on disc 4 is contrasted with a color representing a mixture 9 of two pure colors, of disc 3, and further contrasted with a mixture 14 (on disc 2) of one of the pure colors on disc 3 and a third color. Thus, for instance, the center window of the windows 22 shows, on disc 4 (Fig. 1) the pure color "Orange," on disc 3 an "Orange-Yellow" mixture in which orange dominates, and a "Green-Yellow" mixture on disc 2 in which the green dominates. At the same time both the orange dark shade and the orange tint are contrasted with the related dark shades and tints of the mixtures of disc 3 (orange-yellow) and disc 2 (green-yellow). Other 25% contrasts are shown through the windows 23.

Figure 6:
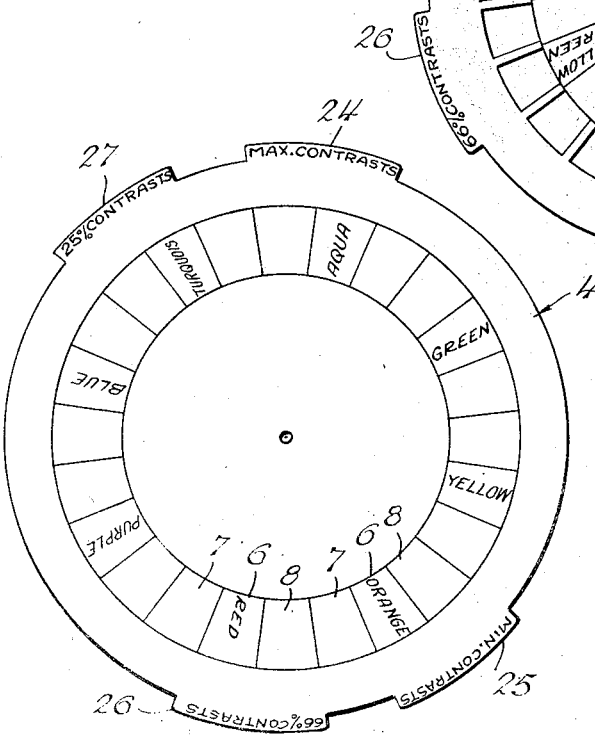

In order to bring about the proper alignment of the colors on each disc when related tabs are superposed, it is necessary that the tabs be definitely positioned on their respective discs. This relation with respect to each of the discs 2, 3 and 4 is shown in Figs. 4, 5 and 6, from which it will appear that the minimum contrast tab 25 of disc 2 is opposite the "Orange-Red" segment, in disc 3 opposite the "Red-Orange" segment, and in disc 4 opposite the "Orange" segment. The maximum contrast tab 24 of disc 2 is opposite the "Aqua-Green" segment, in disc 3 opposite the "Purple-Red" segment, and in disc 4 opposite the "Aqua" segment. The 66% contrast tab 26 of disc 2 is intermediate the "Blue-Turquoise" and "Turquoise-Aqua" segments, in disc 3 opposite the "Yellow-Green" segment, and in disc 4 opposite the "Red" segment. The 25% contrast tab 27 of disc 2 is opposite the "Purple-Blue" segment, in disc 3 opposite the "Turquoise-Blue" segment, and in disc 4 opposite the "Turquoise" segment.

The rim of the disc 2 is provided with a composite chart 28, provided with 72 segments, each segment bearing one of the colors on the three discs 2, 3 and 4, the total number whereof is also 72. The chart 28 is circumferentially divided into eight divisions, each division consisting of nine segments, the center segment 29 of each division bearing one of the pure colors of the disc 4 in the same order. On each side of each pure color segment 29 on the chart 28 the border colors 30 and 31 corresponding to "dark shade" and "light tint" are arranged (of disc 4). On the dark shade side and next thereto in the three succeeding segments 32, 33 and 34 are arranged the color mixtures 15, 14, 16 shown on disc 2. On the other side of the segment 29 next to the tint 31 and in the segments 35, 36 and 37 are arranged the color mixtures 10, 9, 11 shown on disc 3. Thus, with respect to the pure color "Orange" (6, on disc 4) it will be reproduced on chart 28 at 29, bordered by its dark shade and tint (7 and 8 on disc 4) at 30 and 31; the color "Yellow-Orange" and its dark shade and tint (14, 16 and 15) on disc 2 will be reproduced in segments 33, 34 and 32 on the chart 28; the color "Red-Orange," its dark shade and tint on disc 3 will be reproduced in the segments 36, 35 and 37 on the chart 28. The pertinent combinations are repeated with respect to the remaining seven pure colors.

The foregoing description sets forth the physical characteristics of this invention when used to obtain color contrasts which have a relative color value and relation, but the device may be used at the will of the manipulator to put together all different forms and combinations of color contrasts within the capacity of the device by merely ignoring superposing like tabs and by manipulating the individual discs to expose at the windows any desirable color combination or, if desired, by superposing unlike tabs which would give a comparison of the particular colors on the discs of such unlike tabs.

The warm or advancing colors, such as the reds and yellows, have long wave lengths and are bright and stimulating, whereas the cool or receding colors, as the greens and blues, have short wave lengths and are quiet and restful. The warm or advancing colors should be used in proportionately less area than the cool or receding colors. This is especially true when the warm or advancing colors are used as complementaries to the cool and receding colors, or vice versa. To illustrate, an examination of disc 4 shows the colors of the spectrum in their relative warm relation, in which the warmest color is yellow and the least warm color is blue. It is advisable, therefore, to contrast, in the matter of area, less yellow than blue, and a gradually reduced amount of area for each of the colors which lie between blue and yellow. This is accomplished by the eccentric contour of the disc 3, which, when the complementary tabs are superposed, cuts down the amount of exposed area of the colors ranging from the greatest exposure of blue to the least exposure of yellow.

I claim:

1. A device for arranging colors in a predetermined relation comprising a plurality of superimposed discs centrally pivoted to each other, one of said discs having annularly arranged thereon a series of groups of color segments, each group being composed of a segment of pure color positioned intermediate a segment bearing a tint of said color and a segment bearing a darker shade of said color, a second disc having annularly arranged thereon a series of groups of color segments, each group including a segment provided with a color representing a combination of two pure colors and positioned intermediate a segment bearing a tint of said combination color and a segment bearing a darker shade of said combination color, and a third disc having annularly arranged thereon a series of groups of color segments, each group of said third disc including a segment provided with a color representing a different combination of two pure colors and positioned intermediate a segment bearing a tint of such combination color and a segment bearing a darker shade of such combination color, each series of color segments, on the individual discs, being arranged to form an annular color band and the annular color band of each disc being arranged at a different radial distance from the said pivot, each of the upper discs being provided with apertures, the apertures in each of the upper discs being arranged so that they may be radially aligned with the apertures in the other discs to expose radially aligned color segments of the annular bands, and indicating means provided on said discs and being manipulatable to bring into registry with the color segments of said first mentioned disc, color segments of said second and third discs which contrast with the color segments of said first mentioned disc in any one of a plurality of different predetermined degrees of contrast.

2. A device such as claimed in claim 1, wherein the pure colors on said first mentioned disc are arranged in spectrum sequence and the color of each of the intermediate combination color segments of said second disc represents a combination of the pure colors of two adjacent groups of said first mentioned disc, one of such pure colors in said segments predominating over the other, and the color of each of the intermediate combination color segments of said third disc represents a combination of the same pure colors as the corresponding segment of said second disc but in which the other of such pure colors predominates.

3. A device such as claimed in claim 1, wherein the pure colors on said first mentioned disc are arranged in spectrum sequence and the colors of the intermediate combination color segments of said second and third discs are arranged in spectrum sequence and each represents a combination of the pure colors of two adjacent groups of said first mentioned disc, one of said pure colors in each intermediate segment of said second disc predominating over the other pure color and the other of such pure colors predominating in each corresponding intermediate segment of the third disc, and said indicating means comprises a plurality of spaced tabs on each of said discs representing a plurality of different predetermined degrees of contrast the tabs on each disc being similar in number and in degree of contrast to the tabs on the other two discs but spaced at different distances from the corresponding tabs of the other two discs, whereby a plurality of color combinations contrasting in different predetermined degrees with a specific pure color on said first disc may be obtained by aligning corresponding tabs on the three discs.

4. A device such as claimed in claim 1, wherein said first mentioned disc underlies said second disc and the latter underlies said third disc, the segments on all three discs being equal in number, said device including a fourth disc overlying and rotatable relative to said third disc, said fourth disc covering the color segments of the three underlying discs and being provided with three segmentally formed apertures, positioned closely adjacent to one another, said apertures each being dimensioned to expose three aligned segments of the underlying discs and the three apertures having an overall width less than the overall width of three adjoining sets of superimposed aligned segments of the underlying discs.

5. A device such as claimed in claim 1, in which the color segments of at least one of said discs have predetermined variable lengths in a radial direction, the lengths of the segments of brighter colors in such discs being less than the lengths of the segments of quieter colors whereby when the color segments of said discs are aligned there is produced not only a selected contrast of colors but also a proper balancing of the amounts of colors in the selected group.

6. A device for arranging colors in a predetermined relation comprising a disc having annularly arranged thereon in a predetermined sequence a series of color segments, a second disc superimposed and centrally pivoted to said first disc and having annularly arranged thereon, in a predetermined sequence and at a different radial distance from the pivot of said device than the series of color segments on said first mentioned disc, a series of color segments arranged to be radially aligned with the segments on said first mentioned disc, apertures in the superimposed disc at the same radial distance as the annularly arranged color segments in said first mentioned disc and adapted to be aligned at will over several of said color segments so as to expose to view simultaneously such color segments, the color segments of said second disc being different in area from the color segments of said first disc exposed through the said apertures of said second disc and being gradually varied in length in a radial direction, the lengths of the segments of brighter colors in said second disc being less than the lengths of the segments of quieter colors whereby when the color segments of said discs are aligned there is produced not only a selected contrast of colors but also a proper balancing of the amounts of the colors.

7. A device for arranging colors in a predetermined relation comprising a disc having annularly arranged thereon in a predetermined sequence a series of color segments, a second disc superimposed on said first disc and centrally pivoted thereto, said second disc having annularly arranged thereon in a predetermined sequence and at a different radial distance from the pivot of said device than the series of color segments on said first mentioned disc, a series of color segments arranged to be radially aligned with the segments of said first mentioned disc, said second disc having arranged in annular relation around its segments and adjoining the outer edges of the latter, a series of segmentally shaped windows similar in number to the number of segments of said disc, the said windows overlying the segments of the lower disc, the line of juncture between said windows and segments being eccentric in form so that said windows in a radial direction gradually vary in length to expose in proportionately lesser amounts, warm colors of the first disc when aligned with contrasting colors of the second disc and to expose in proportionately greater amounts, colder colors of the first disc, when aligned with contrasting colors of the second disc.

JOSEPH P. GAUGLER.